United States Patent Office 3,313,032
Patented Apr. 11, 1967

3,313,032
FREEZE-DRYING PROCESS AND APPARATUS
George J. Malecki, Chicago, Ill., assignor to the United States of America as represented by the Secretary of Agriculture
Filed July 28, 1966, Ser. No. 568,568
8 Claims. (Cl. 34—5)

This application is a continuation-in-part of my copending application, Serial No. 256,170, filed Feb. 4, 1963, now abandoned.

This invention relates to and has among its objects the provision of novel processes for freeze-drying materials such as liquid foods, solid foods, biological substances, etc. The objects of the invention also include the provision of novel apparatus for conducting freeze-drying. Further objects of the invention will be evident from the following description and the appended drawings, wherein.

Figure 1:
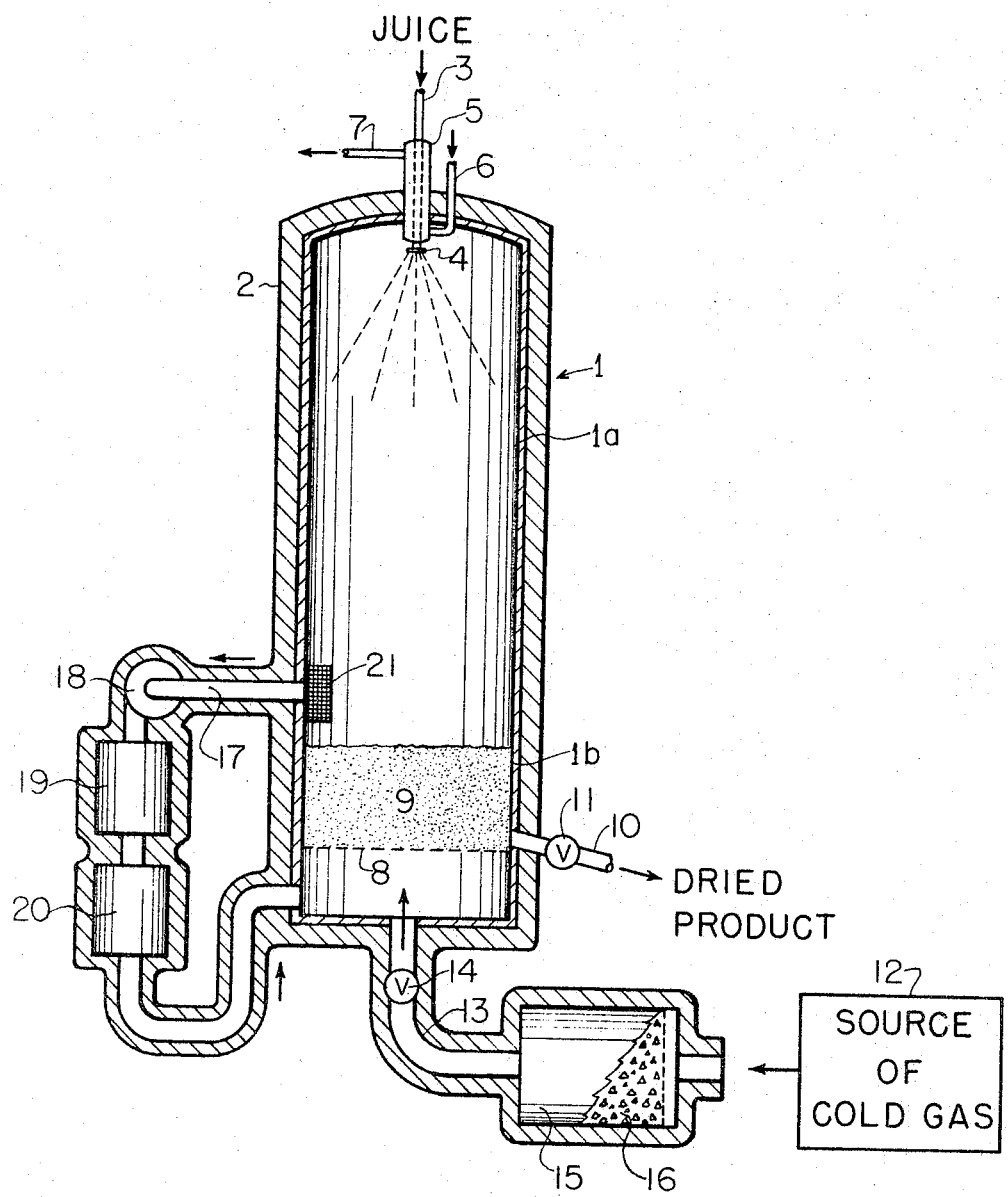
FIGURE 1 is a view, partly in cross-section, of one embodiment of an apparatus constructed according to the present invention.

The various methods for freeze-drying conventionally practiced in industry all have the common feature that the frozen material is exposed to high vacuum to effect the desired sublimation of ice. Because these conventional processes are conducted under vacuum, the removal of moisture is slow and costly. The equipment must be able to resist the stresses generated by low pressure operation, with the result that it must be of very sturdy construction and hence very expensive.

In accordance with the invention, freeze-drying is conducted not under vacuum but at ordinary (normal) atmospheric pressure. Many significant advantages are achieved in a practice of the present invention, including faster rate of dehydration, more uniform dehydration of individual particles, and a substantial saving in equipment costs because the apparatus may be of lighter and simpler construction.

In accordance with the invention, the material to be dehydrated is first formed into frozen particles. This can be accomplished in various ways, as described below.

(A) *Formation of frozen particles*

Where the starting material is a liquid—for example, milk, a fruit juice, a liquid preparation of coffee or tea, a flavor essence, blood plasma, whole blood, etc.—it may be sprayed into a cold liquid medium such as methylene chloride, fluorinated hydrocarbon derivative, petroleum distillate, or other inert, volatile solvent of low freezing point. In this way the liquid material is converted into frozen droplets.

In a preferred mode of operation, the liquid starting material is sprayed into an atmosphere of refrigerated gas to form frozen droplets. The nature of the gas is not a critical item and one may use any gases which are nontoxic and nonreactive with the material undergoing treatment, for example, nitrogen, nitrous oxide, carbon dioxide, helium, or other of the inert gases, methane, hydrogen, fluorocarbons such as difluoromethane, trifluoromethane, tetrafluoromethane, monochlorotrifluoromethane, etc. Ordinary air may also be employed but is not a preferred example, as it may cause oxidation of oxidation-labile components in the material under treatment.

In a preferred embodiment of the invention, the liquid starting material is formed into frozen droplets by conducting the freezing in cooperation with the drying step. In brief, the technique involves using cold gas emanating from the drying zone as the refrigerant to freeze the incoming spray of liquid material to be dried. This novel procedure is described in more detail below in conjunction with the explanation of FIG. 1.

If the liquid material is a syrup, emulsion, or other viscous product that is not readily sprayed from a nozzle into a refrigerated liquid or gas, it may be frozen in blocks or other shape with liquid nitrogen or other refrigerant, and then ground into a powder while maintained in the frozen state.

Where the starting material is a solid substance, it may be directly frozen in conventional manner if already in particulate form. If not in such state, it may be reduced to particles and then frozen, or, alternatively, it may be frozen and then comminuted to form the desired frozen particles. Typical of the solid materials which may be dehydrated in accordance with the invention are biological materials such as bone, arteries, body tissue, organs; and foods such as fruits, vegetables, meats, sea food, herbs, cheeses, etc.

In some cases, it is desirable to add to the frozen particles a finely powdered innocuous material such as salt; sugar; starch; or calcium, magnesium, or aluminum silicate. Such additive is useful to prevent coherence of particles and to assist in maintaining a fluidized condition (in the subsequent dehydration step) where the frozen particles are of larger dimensions. After completion of the dehydration, the additive can be removed from the product by application of such conventional separation techniques as sifting.

(B) *Dehydration*

Having formed the frozen particles, these are arranged to form a bed thereof. A pre-dried gas is injected upwardly through the bed to maintain it in a fluidized condition and to dehydrate the particles while they are maintained in the frozen state. It is especially to be noted that this dehydration step is not under vacuum, but is conducted at essentially normal atmospheric pressure. Despite the absence of a vacuum, the desired result of dehydration is attained because the injected gas, being in a pre-dried condition, has a moisture vapor pressure below the moisture vapor pressure exhibited by the material under treatment. This difference creates a driving potential which causes the ice in the material to sublime (pass directly to the vapor state). The evolved moisture vapor is carried away by the stream of gas.

Also, under the conditions of strong turbulence and intimate contact between the dry gas and the suspended frozen particles in the fluidized system, moisture removal becomes very efficient. Furthermore, the movement of the dry gas and particles sweeps moisture vapor away from the particles much more effectively than is obtained in a vacuum system. This efficient removal of vapor from a turbulent surface markedly accelerates the drying rate.

Ordinarily, nitrogen is used as the gas in the dehydration because it is nontoxic, nonreactive with the material under treatment, and inexpensive. However, this is not a critical matter and one can use other gases which are nontoxic and nonreactive as, for example, nitrous oxide, carbon dioxide, helium or other of the so-called inert gases, methane, hydrogen, or fluorocarbons such as difluoromethane, trifluoromethane, tetrafluoromethane, monochlorotrifluoromethane, etc. Ordinary air may also be employed, but is not a preferred example as it may cause oxidation of oxidation-labile components in the material under treatment.

As noted above, the gas is dried before contacting it with the bed of frozen particles. To achieve this condition the gas is treated with a conventional drying agent such as phosphorus pentoxide, calcium sulphate, magnesium perchlorate, activated alumina, or silica gel. Particularly preferred are the materials conventionally known as molecular sieves. These are aluminosilicates or zeolites, the crystals of which contain minute pores and which have the ability to absorb large volumes of water vapor. Also, the molecular sieves, when spent, may be readily regenerated by passing a hot gas (such as air or nitrogen) through them. If desired, other methods or means can be employed for removal of moisture from the gas stream. For instance, moisture may be frozen out of the gas by passing the gas through a cooler at a temperature much lower than the average temperature of the fluidized bed. As an example of such procedure, the gas may be passed through a chamber cooled with liquid nitrogen at about minus 193° C. Also, moisture could be extracted from the gas by means of a moisture-absorbing liquid such as glycerin, applied at a temperature about equal to the temperature of the fluidized bed.

Since the dehydration in accordance with the invention involves dehydration from the frozen state, it is evident that the gas entering the drying zone should be at a temperature low enough that it does not thaw the frozen particles on contact therewith. At the same time its temperature should be high enough to attain sublimation of ice at a useful rate. It is impossible to provide numerical limits on the temperature range which may be employed because so many different factors affect the situation. For example, if the frozen particles are at an especially low temperature, say $-100°$ F., one can apply the gas at a higher temperature without danger of thawing than in a case where the particles are at a higher temperature, say 0° F. Also, the physical characteristics of the particles will vary depending on their composition and particularly their moisture content. Thus, for example, particles with a relatively low moisture content will be able to withstand a higher gas temperature without detriment (e.g., without shrinking, losing porosity, or becoming sticky) than will particles that have a high moisture content. Other factors which influence the system are the relative quantities of particles and gas in the system or in continuous operation the rates at which the particles and gas are fed into the system; the size of the particles; and the degree of turbulence in the fluidized system. In any particular case, the appropriate gas temperature to be used can be readily ascertained by conducting several pilot runs at different gas temperatures and noting which one yields optimum drying rate without thawing of the frozen particles.

Ordinarily the fluidized bed is established by injecting the pre-dried gas up into the bed through a plurality of openings formed, for example, by a screen or sheet of perforated metal which supports the bed. In some cases, however, it is preferred to use what may be termed a fountain arrangement wherein the pre-dried gas is injected upwardly as a single stream. In this kind of operation, the particles in the center of the bed are thrown upward, usually to a height of a few inches, by the gas stream so that the system resembles a fountain. This type of bed has less advantageous heat transfer characteristics than the usual multi-jet fluidized bed but is preferred with the coarser particles and with particles of sugar-containing materials (fruit pieces, fruit juices) which tend to have sticky surfaces. With such materials less coherence of particles is attained with the fountain-type bed. In any event, it is to be emphasized that both the regular and fountain types of fluidized beds are characterized by a dynamic state wherein particles are constantly in an agitated, intermittently-suspended condition that yields exceptionally efficient freeze-drying.

Attention is now directed to the annexed drawing which illustrates apparatus in accordance with the invention.

Referring in detail to FIG. 1, the illustrated device includes a chamber, generally designated as 1, which provides an upper (freezing) zone 1a and a lower (drying) zone 1b.

Reference numeral 2 designates thermal insulation which covers chamber 1 as well as the other elements of the device.

For introducing the liquid to be dried—fruit juice, for example—there is provided a conduit 3 connecting with spray nozzle 4. A heating jacket 5 is provided about conduit 3 to prevent the juice from freezing before it is atomized. A suitable heating heating medium such as warm water may be circulated through jacket 5 via pipes 6 and 7.

The liquid sprayed from nozzle 4 meets a column of cold gas in chamber 1a, whereby the droplets of liquid are converted into frozen particles. The size of the frozen particles can be regulated by the type of nozzle used, and is preferably maintained at 30–200 microns, although larger particles up to ½-inch in diameter can be used. As the frozen particles are formed they drop down from freezing chamber 1a to drying chamber 1b.

Positioned in the lower part of chamber 1 is a screen 8, for supporting a bed 9 of frozen particles and for permitting passage of an upward flow of gas. Dried product is removed from the system via conduit 10 and valve 11. Excess gas may be vented from the system together with dried product via conduit 10. If necessary electrostatic precipitation, filtration, centrifugation, or a pneumatic cyclone system may be provided to separate the particles of product from the excess gas.

Cold nitrogen, or other gas, from source 12, is introduced into the system via conduit 13 and valve 14. Interposed in conduit 13 is a drier 15, provided with granules of drying agent 16, whereby the moisture is removed from entering gas.

For recirculating gas through bed 9, there is provided a recirculation conduit 17, pump 18, drier 19, and heat exchanger 20. In operation, part of the gas rising through bed 9 is propelled by pump 18 through drier 19 and heat exchange 20 back to the base of chamber 1. Drier 19 removes from the gas stream the moisture which has been taken up from the particles being dehydrated. Drier 19 may be constructed similar to gas drier 15. Heat exchanger 20 is not a critical item but may be provided to heat or cool the recirculating gas as necessary under specific conditions of operation. A screen or filter 21 is provided at the upper end of conduit 17 to prevent entrainment of particles in the gas stream. This filter may be provided with a conventional vibrator to remove deposits of solid material.

In operation of the device of FIG. 1, the falling droplets in freezing zone 1a will cause a circulation within the column of cold air in the said zone, whereby the gas is stirred and its temperature is equalized so that it retains its ability to freeze the sprayed liquid droplets. It is preferable not to have an outlet at the top of chamber 1, because the thus-formed stream of gas might carry away much of the finer particles of material. However, if it is desired to have a more positive circulation of the freezing gas, this can be attained by providing an outlet in the top of chamber 1. This outlet would then be provided with a cyclone separator or the like for the separation of fine particles from the gas stream and suitable ducts for return of the particles to the fluidized bed and return of the gas to the bottom of drying chamber 1b.

*Additional description of the operation of FIG. 1, also serving as Example I*

Orange juice is sprayed from nozzle 4 into upper (freezing) chamber 1a. Cold nitrogen (or air, $CO_2$, $N_2O$, etc.) at about minus 40° F. is rising countercurrently from below fluidized bed 9 and in zone 1a, freezes the falling droplets of juice to solid particles. These solid particles drop down to zone 1b, forming bed 9. The size of the droplets is regulated, preferably to about .05 to 0.1 mm. in diameter, and the flow of gas is adjusted accordingly to maintain the fluidized state in bed 9, as well as to maintain proper freezing of the incoming liquid droplets. The rate of cooling gas flow should be large enough to freeze all the droplets to below the eutectic point of the material under treatment, but not so large as to carry away the majority of the smaller size droplets. In order to be able to correlate the rate of flow of gas through the freezing chamber, there is provided the recirculation system of conduit 17 and associated components. Any excess or deficiency of gas going into the freezing chamber 1a can be removed or supplemented by this recirculation or by-pass system. During operation heat exchanger 20 may be activated to heat or cool the recirculating gas stream to the appropriate temperature level (about minus 40° F., in this particular example).

As noted hereinabove, the gas flowing through bed 9 effects a sublimation of ice from the frozen particles. The evolved vapor is carried away by the gas stream and eventually absorbed by drier 19.

The process may be continued until the orange juice particles are completely dried, or preferably, the process is continued until their moisture content is about 10%. This product is then withdrawn via conduit 10 and may then be further dried by the system shown in FIG. 3.

Figure 2:
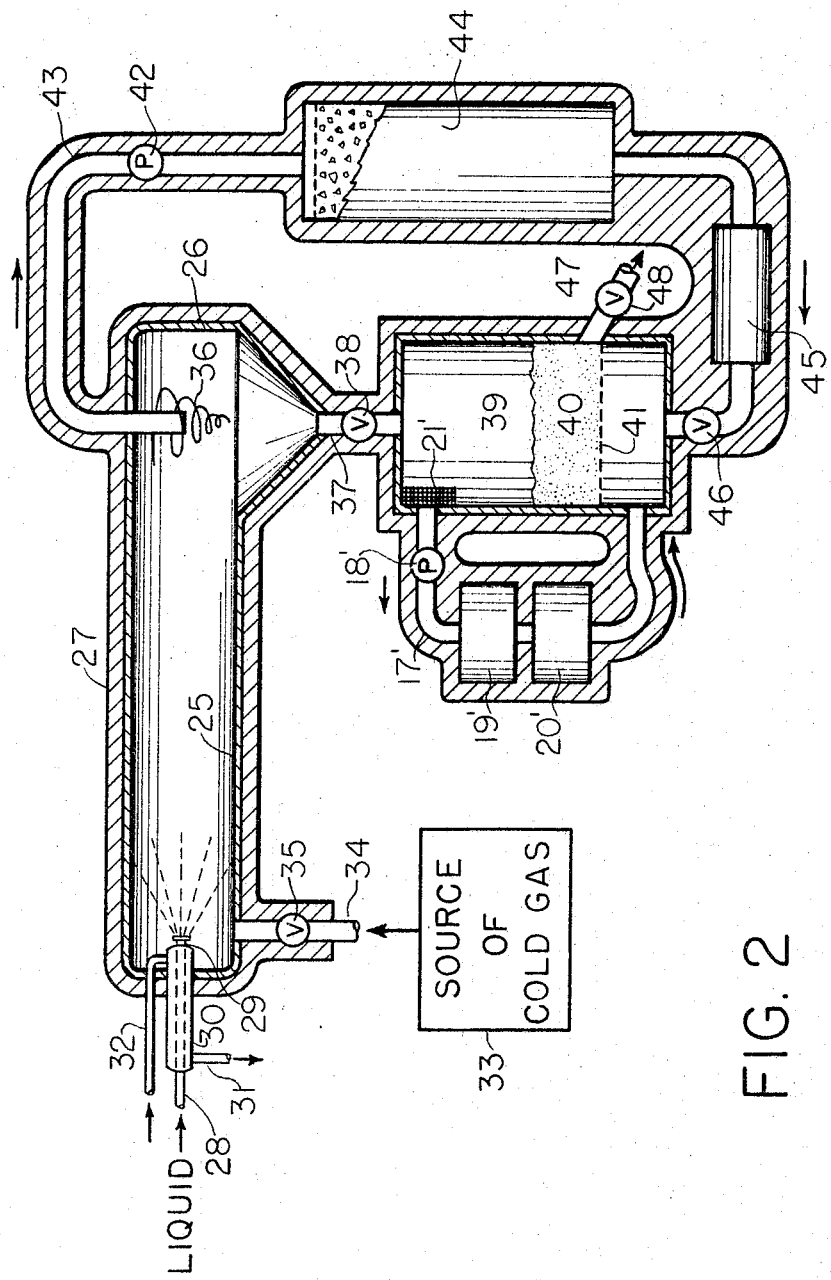
FIGURE 2 is a view, partly in cross-section, of a modified embodiment of an apparatus in accordance with the present invention.

Reference is now made to FIG. 2 which depicts another modification of the apparatus of the invention. The illustrated device includes a horizontally-disposed spray-freezing chamber 25 which connects with a cyclone separator 26 of generally conical configuration.

Thermal insulation 27 is provided about chamber 25 and other parts of the system.

For introducing the liquid material to be dried, there is provided a conduit 28 connecting with spray nozzle 29. A heating jacket 30 is provided about conduit 28 to prevent the liquid from freezing before it is atomized. A suitable heating medium, such as warm water, may be circulated through jacket 30 via pipes 31 and 32.

Cold gas ($N_2$, air, $CO_2$, etc.) from source 33 is fed into freezing chamber 25 via pipe 34 and valve 35. The cold gas flows concurrently with the droplets of liquid sprayed from nozzle 29 whereby the droplets are frozen into solid particles. As these solid particles suspended in the stream of cold gas enter cyclone separator 26, a vortex condition 36 (shown diagrammatically) is created. Thereby the frozen particles are separated from the stream of gas.

The separated frozen particles drop through conduit 37 and valve 38 into drying chamber 39 where they form a bed 40 supported by a screen 41.

The separated gas is directed by pump 42 through conduit 43, thence through drier 44, heat exchanger 45, and valve 46 to the base of drying chamber 39. The resulting stream of dry gas flows upwardly through the bed 40 of frozen particles, fluidizing it and effecting the desired freezing-drying.

Also provided is a recirculation system including conduit 17′, pump 18′, drier 19′, heat exchanger 20′, and filter 21′, all of which function as their counterparts (17, 18, 19, 20, and 21) in the apparatus of FIG. 1.

In operation, it will be evident that heat exchangers 45 and 20′ are activated as necessary so that the gas flowing upwardly through bed 40 is at a temperature high enough to attain a useful dehydration rate yet not so high as to thaw the frozen particles in the bed. In connection with temperature control of the gas stream, it may be noted that in passing through the fluidized bed of frozen particles the gas is cooled due to heat being absorbed by the sublimation of ice. On the other hand, dehydration of the gas in passing through a drier (19′ or 44) results in heating of the gas. However, it is not claimed that the cooling and heating effects necessarily balance one another and consequently the heat exchangers 45 and 20′ may be required to act in heating or cooling cycles, depending on the particular conditions of operation.

Dried product is removed from the system via conduit 47 and valve 48. Excess gas may also be vented from the system via conduit 47. If necessary, electrostatic precipitation, filtration, centrifugation, or a pneumatic cyclone apparatus may be provided to separate the particles of product from the vented gas.

A particular benefit of the apparatus of FIG. 2 is that the liquid to be dehydrated may be sprayed as a fine mist (particle size 100–200 microns, for example). Thereby very rapid freezing rates are attained. Moreover, the resulting fine particles of frozen material are readily separated from the freezing gas stream by the cyclone arrangement so that they can then be dehydrated. Because of the rapid freezing which can be attained with the device of FIG. 2, it is particularly adapted for the dehydration of biological materials such as blood, vaccines, plasma, antibiotics, etc.

Figure 3:
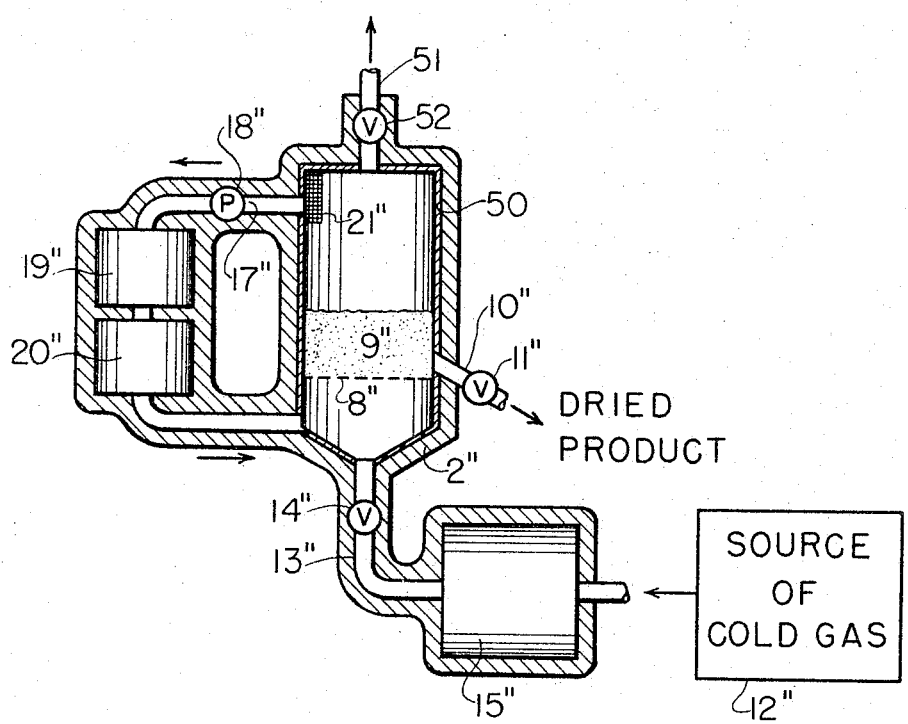
FIGURE 3 is a view, partly in cross-section, of a fluidized bed freeze dryer intended for final drying of material in accordance with the invention, which material was preliminarily freeze-dried in apparatus as shown in FIG. 1 or FIG. 2 herein, or which material was preliminarily freeze-dried in conventional drying equipment.

The apparatus shown in FIG. 3 is intended for the freeze-drying of material which was preliminarily dried in apparatus according to FIG. 1 or FIG. 2, or in a conventional vacuum freeze-drying unit. The device includes a drying chamber 50, provided with a conduit 51 and a valve 52 located at the top of the chamber. The various other parts of the apparatus are as in the modification of FIG. 1 and are indicated by the same reference numerals with a double prime sign.

In operation, the frozen, partly-dried particles are introduced into chamber 50, forming bed 9″. Cold dry gas is circulated through the bed, keeping it in a fluidized state and effecting the dehydration. During the operation, heat exchanger 20″ may be activated as required so that the gas re-entering the drying chamber is warm enough to effect the sublimation of ice yet not so warm as to cause thawing of the frozen particles.

Fresh, dry, cold gas ($N_2$, air, $CO_2$, etc.) as may be needed is fed into the system from source 12″ via conduit 13″, drier 15″, and valve 14″. Excess gas may be vented via valve 52, valve 11″, or both.

After the product has been dried to the desired extent, it is withdrawn via conduit 10″ and valve 11″.

In a preferred system of applying the invention, the dehydration is conducted in two phases: It is initiated in the device of FIG. 1 (or FIG. 2) and when the material is partly dry it is transferred to the device of FIG. 3 and the drying completed therein. The primary advantage to be gained by this procedure is that the porous structure of the particles is set by the preliminary drying. Therefore, a higher gas temperature (with higher rate of dehydration) can be applied in the final drying without damage to the particles. Thus, for example, whereas in a particular instance the initial dehydration may require a temperature as low as −30° F., the final dehydration may be at a more elevated temperature of about −5 to −20° F.

In using the devices of FIGS. 1, 2, and 3, it is usually preferred that they be operated under a small positive pressure, for example, 1 to 25 cm. of Hg gauge pressure. In this way, there is no chance of leakage of atmospheric air into the drying systems. Such leakage would be undesirable as introducing moisture in the drying zone. Moreover, by operating at the positive pressure the dry product is readily ejected from the device on opening of the appropriate valve (11 in FIG. 1, 48 in FIG. 2, 11″ in FIG. 3).

Having thus described the invention, I claim:

1. A method for freeze-drying a material at essentially atmospheric pressure which comprises:
(a) freezing particles of the material,
(b) forming a bed of the frozen particles, and
(c) injecting a pre-dried gas upwardly through the bed of frozen particles at essentially atmospheric pressure to maintain the bed in a fluidized condition and to dehydrate the particles, the temperature of the injected gas being high enough to be effective to cause sublimation of ice but not so high as to thaw the frozen particles.

2. The process of claim 1 wherein the gas exiting from the bed of frozen particles is redried and recirculated upwardly through said bed.

3. The process of claim 1 wherein the gas exiting from the bed of frozen particles is contacted with a fresh batch of material to form the frozen particles.

4. The process of claim 1 wherein the gas exiting from the bed is divided into two separate streams, one stream being redried and recirculated through the said bed, the other stream being contacted with a fresh supply of material to form frozen particles thereof.

5. A process for freeze-drying a liquid at essentially atmospheric pressure which comprises:
(a) spraying the liquid into a stream of cold gas to form frozen particles of the liquid,
(b) collecting the frozen particles and forming a bed thereof,
(c) injecting a pre-dried gas upwardly through the bed of frozen particles at essentially atmospheric pressure to maintain the bed in a fluidized condition and to dehydrate the particles, the temperature of the injected gas being high enough to be effective to cause sublimation of ice but not so high as to thaw the frozen particles.

6. Apparatus for freeze-drying food or biological materials, said apparatus comprising:
(a) a source for providing a flow of gaseous medium at a temperature below the freezing point of the material to be freeze-dried;
(b) a first thermal-insulated container defining a freezing chamber;
(c) a first valve for controllably admitting said flow of gaseous medium from said source into said freezing chamber;
(d) sprayer means for spraying said material to be freeze-dried into said freezing chamber in liquid droplet form, said sprayer means being positioned relative to said first valve such that said droplets are brought into contact with said gaseous medium whereby said droplets are frozen into small particles;
(e) a second thermal-insulated container disposed in a position lower than said first container, conduit and valve means interconnecting a lower portion of said first container with an upper portion of said second container for controllably enabling gravitational descent of said small particles from said first container into said second container;
(f) a screen disposed in said second container below said conduit and valve means for collecting said small particles;
(g) conducting means for conducting said gaseous medium from said freezing chamber to the interior of said second container at a point below said screen, said conducting means including a pump for moving said gaseous medium through said conducting means, a drying chamber containing a drying agent for drying said gaseous medium being conducted from said freezing chamber to said drying chamber, and a valve for controllably admitting said gaseous medium from said conducting means into said second container at said point below said screen;
(h) recirculating means having an inlet communicating with the interior of said second container at a point above said screen and an outlet communicating with the interior of said second container at a point below said screen, said recirculating means including a pump for moving said gaseous medium through said recirculating means from said inlet to and out of said outlet at a rate such that said gaseous medium is caused to flow upwardly through said screen maintaining said small particles collected on said screen in a fluidized bed condition, the intimate passage of said gaseous medium through said fluidized bed acting to absorb moisture from said small particles; and
(i) exit conduit and valve means adjacent the upper side of said screen for controllably withdrawing said small particles from said screen.

7. The apparatus as defined in claim 6 wherein said freezing chamber is horizontally elongate with said sprayer means and said first conduit and valve means being in adjacency at one end region of said freezing chamber and relatively positioned such that said gaseous medium and said droplets move substantially in the same horizontal direction in said freezing chamber toward the opposite end of said freezing chamber.

8. The apparatus as defined in claim 6 wherein a cyclone separator is provided at said opposite end of said freezing chamber for separating said small particles from said gaseous medium entering said conducting means and for causing said separated small particles to enter said conduit and valve means.

References Cited by the Examiner
UNITED STATES PATENTS

| | | | |
|---|---|---|---|
| 2,467,318 | 4/1949 | Kellogg | 34—5 |
| 2,699,045 | 1/1955 | Bailey | 62—57 |
| 2,843,942 | 7/1958 | Whitsel | 34—57 |
| 3,040,438 | 6/1962 | Perlman | 34—57 |
| 3,052,557 | 9/1962 | Vidal | 62—74 |
| 3,269,025 | 8/1966 | Dryden | 34—5 |

WILLIAM J. WYE, *Primary Examiner.*

Disclaimer 3,313,032.—*George J. Malecki*, Chicago, Ill. FREEZE-DRYING PROCESS AND APPARATUS. Patent dated Apr. 11, 1967. Disclaimer filed Apr. 22, 1968, by the assignee, *United States of America as represented by the Secretary of Agriculture*.

Hereby enters this disclaimer to claims 1 and 2 of said patent.

[*Official Gazette September 24, 1968.*]